(12) United States Patent
Burges et al.

(10) Patent No.: US 7,937,264 B2
(45) Date of Patent: May 3, 2011

(54) LEVERAGING UNLABELED DATA WITH A PROBABILISTIC GRAPHICAL MODEL

(75) Inventors: Christopher J. C. Burges, Bellevue, WA (US); John C. Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 11/170,989

(22) Filed: Jun. 30, 2005

(65) Prior Publication Data

US 2007/0005341 A1 Jan. 4, 2007

(51) Int. Cl.
G06F 17/27 (2006.01)
(52) U.S. Cl. ............................................ 704/9
(58) Field of Classification Search ................. 704/9, 10
See application file for complete search history.

(56) References Cited

U.S. PATENT DOCUMENTS

| | | | | |
|---|---|---|---|---|
| 6,154,736 | A * | 11/2000 | Chickering et al. | 706/59 |
| 7,310,624 | B1 * | 12/2007 | Aggarwal et al. | 706/45 |
| 2002/0010691 | A1 * | 1/2002 | Chen | 706/20 |
| 2002/0107853 | A1 * | 8/2002 | Hofmann et al. | 707/7 |
| 2003/0140020 | A1 * | 7/2003 | Chen et al. | 706/15 |
| 2004/0181441 | A1 * | 9/2004 | Fung et al. | 705/7 |
| 2004/0202987 | A1 * | 10/2004 | Scheuring et al. | 434/118 |
| 2004/0220892 | A1 * | 11/2004 | Cohen et al. | 706/20 |
| 2005/0055209 | A1 * | 3/2005 | Epstein et al. | 704/255 |
| 2006/0015341 | A1 * | 1/2006 | Baker | 704/255 |
| 2006/0026112 | A1 * | 2/2006 | Naphade et al. | 706/46 |
| 2006/0093208 | A1 * | 5/2006 | Li et al. | 382/159 |
| 2006/0167655 | A1 * | 7/2006 | Barrow et al. | 702/181 |
| 2006/0235812 | A1 * | 10/2006 | Rifkin et al. | 706/14 |
| 2006/0288275 | A1 * | 12/2006 | Chidlovskii et al. | 715/513 |

OTHER PUBLICATIONS

Golub et al., Matrix Computations, Johns Hopkins, third edition, 1996, 694 pages, Baltimore, Maryland, USA.
Doyle et al., Random Walks and Electric Networks., The Mathematical Associatino of America, 1984.
Zhu et al., Semi-supervised learning using Gaussian fields and harmonic functions, In Proceedings of the 20th ICML, 2003, Washington D.C.
Dengyong Zhou, Learning with local and global consistency, Advances in Neural Information Processing Systems, MIT Press, 2004, pp. 321-328, vol. 16.
Thorsten Joachims, Transductive Inference for Text Classification Using Support Vector Machines., Proceedings of ICML-99, 1999, pp. 200-209, San Francisco, CA, USA.
Zhu et al., Semi-supervised learning using gaussian fields and harmonic functions, Proceedings of the 20th ICML, 2003, 8 pages, Washington D.C., USA.

* cited by examiner

*Primary Examiner* — Jakieda R Jackson
(74) *Attorney, Agent, or Firm* — Lee & Hayes, PLLC

(57) ABSTRACT

A general probabilistic formulation referred to as 'Conditional Harmonic Mixing' is provided, in which links between classification nodes are directed, a conditional probability matrix is associated with each link, and where the numbers of classes can vary from node to node. A posterior class probability at each node is updated by minimizing a divergence between its distribution and that predicted by its neighbors. For arbitrary graphs, as long as each unlabeled point is reachable from at least one training point, a solution generally always exists, is unique, and can be found by solving a sparse linear system iteratively. In one aspect, an automated data classification system is provided. The system includes a data set having at least one labeled category node in the data set. A semi-supervised learning component employs directed arcs to determine the label of at least one other unlabeled category node in the data set.

17 Claims, 9 Drawing Sheets

LEVERAGING UNLABELED DATA WITH A PROBABILISTIC GRAPHICAL MODEL

BACKGROUND

Due to large databases and sources such as the World Wide Web for example, very large amounts of data are becoming available to many people. Usually this data is not explicitly labeled. For a task such as document categorization for example, it would be useful to take advantage of the large amount of unlabeled data that is available in general, and to help improve the performance of classification and categorization systems, in particular. For example, one may desire to classify documents found on the web into one of several categories, including 'none of the above'.

Various models have been applied to data categorization. Graphical models in one instance provide a powerful framework for approaching machine learning problems that can address many data classification problems. Two common examples are probabilistic graphical models and semi-supervised learning (SSL) on graphs, which can be referred to as Gaussian SSL. Graphs have been used as a general representation of preference relations in ranking problems and also play a role in various approaches to dimensional reduction. Probabilistic graphical models such as Bayes nets, for example, write a probability distribution as a product of conditionals, which exist on nodes, where arcs between nodes encode conditional independence assumptions. Generally, Gaussian SSL is more closely related to random walks on networks where each arc encodes the similarity between the nodes at its endpoints, and the goal is to use neighborhood structure to guide the choice of classification (or regression, clustering or ranking) function.

For Gaussian SSL models, the probabilistic interpretation is somewhat indirect; for graphical models, it is central. In either case of current probabilistic graphical models and semi-supervised learning approaches, potential problems can exist with accurately and efficiently determining data classifications or categorizations. These can include problems processing asymmetrical data sets, problems dealing with small or reduced training sets, and computational complexity thus resulting in processing inefficiency.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Conditional Harmonic Mixing (CHM) enables data to be automatically classified or categorized in a robust and efficient manner, while facilitating solutions to data classification problems that are not present or practically provided for in conventional models. Such modeling can be applied to various applications other than classification such as for regression, clustering, ranking of data and so forth. With CHM, an intermediate graphical model is provided, where both a probabilistic interpretation and Gaussian SSL are emphasized. Generally, in CHM, no attempt is made to model an overall joint density; the utility is found, ultimately, in class conditional posteriors. Although it is assumed that there exists some underlying joint, the model itself is viewed as an approximation; in particular, conditional probabilities may be approximations, and as a result, inconsistent (i.e., no joint exists for which they are the conditionals).

The learning process associated with CHM models leads to a procedure for improving the above approximation. This results in some contrasting differences between CHM and well known probabilistic graphical models such as Bayes nets, for example. With CHM, the process of learning the posteriors, given the conditionals, converges to a global optimum via a straightforward iterative optimization procedure, whatever the structure of the graph (in particular, even if there are loops), provided that there exists a path to each unlabeled point from at least one labeled point. In CHM, as in Gaussian SSL, each node corresponds to a random variable, but in contrast to Gaussian SSL the arcs are directed (having directional or vectored arrows associated with the arcs), and each arc carries a matrix which models a conditional probability. Thus, CHM is a directed graph model, unlike Gaussian SSL. Computed matrices can be rectangular, which corresponds to the posteriors at different nodes corresponding to different numbers of classes for that random variable.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
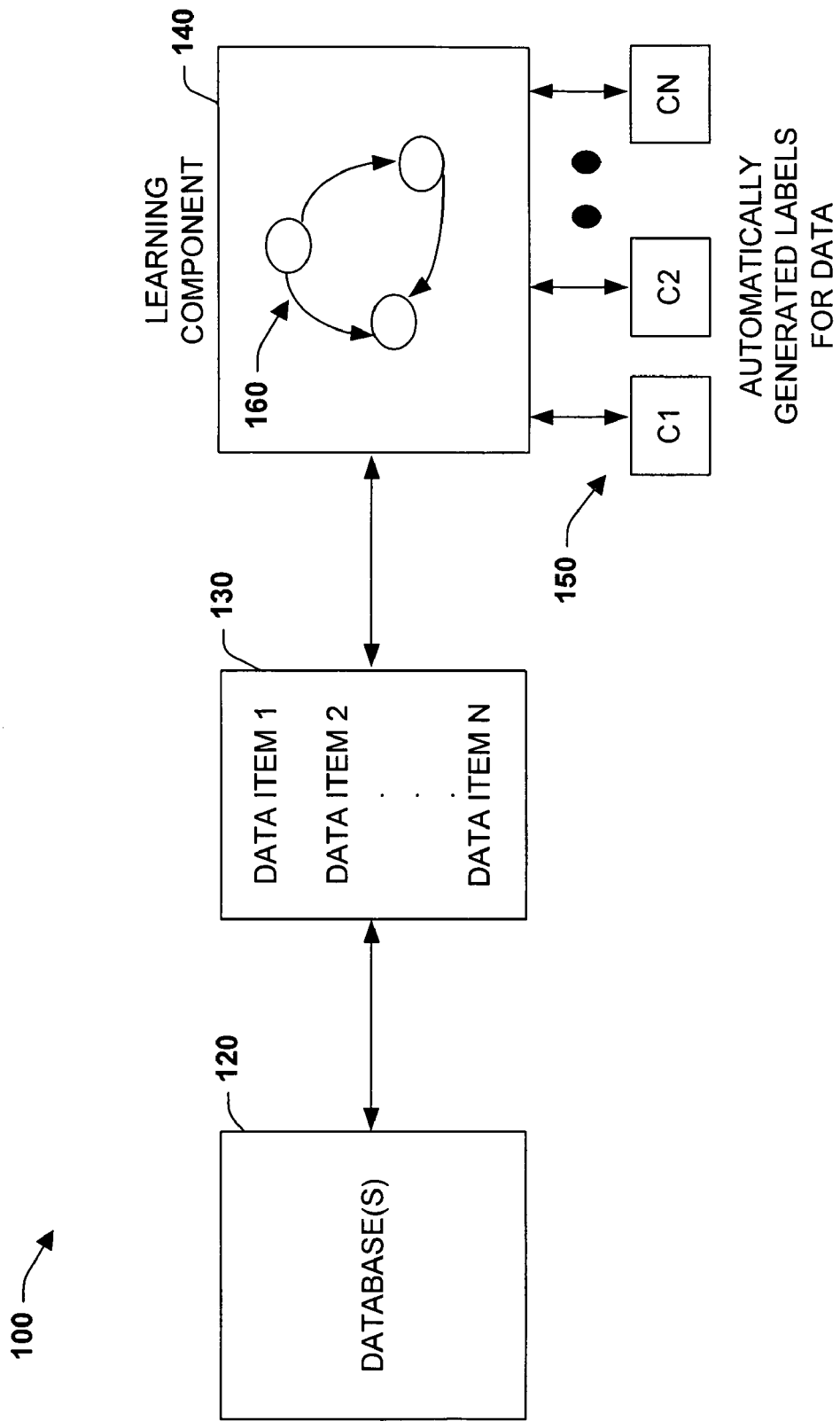
FIG. 1 is a schematic block diagram illustrating an automated data classification system.

Recently graph-based algorithms, in which nodes represent data points and links encode similarities, have become popular for semi-supervised learning. A general probabilistic formulation called 'Conditional Harmonic Mixing' is provided, in which the links between classification nodes are directed, a conditional probability matrix is associated with each link, and where the numbers of classes can vary from node to node. The posterior class probability at each node is updated by minimizing a KL divergence between its distribution and that predicted by its neighbors. For arbitrary graphs, as long as each unlabeled point is reachable from at least one training point, a solution generally always exists, is unique, and can be found by solving a sparse linear system iteratively. This result holds even if the graph contains loops, or if the conditional probability matrices are not consistent. The model also shares the property of other transductive algorithms that it can build on the best available classifier. Thus, given a classifier for a task, CHM can learn its transition probabilities, a process referred to as 'lifting.' In one aspect, an automated data classification system is provided. The system includes a data set having at least one labeled category node in the data set. A semi-supervised learning component employs directed arcs to determine at least one other category node from the data set.

As used in this application, the terms "component," "model," "arc," "node," "matrix," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, a system 100 illustrates a data processing and classification system 100. The system 100 includes one or more databases 120 that store a plurality of data items or data sets 130 that are processed by a semi-supervised learning component 140 (also referred to as learning component) in order to automatically label or categorize one or more subsets of data at 150. In general, a graph based and probabilistic approach is provided by the learning component 140 and is illustrated at 160. The graph 160 contains nodes (represented as circles) which are classifications for data sets and directed arcs for determining labels from at least one labeled node to at least one other unlabeled node. Such graphs 160 will be described in more detail below with respect to FIG. 2. The databases can include local databases, local Intranet databases, remote databases such as existing on the Internet, or a combination thereof. The following provides but one example of how the system 100 can be applied.

In one specific example, assume that the data items 130 are documents and that it is desired to automatically to categorize the documents. The data can be represented as the graph 160, where nodes in the graph are the documents, and where links encode similarity between documents (measured for example by some function of the words comprising the two documents). For this approach, there should be at least one labeled document in the collection. The system 100 provides for evaluating the graph 160 so that, after evaluation, there is a probability attached to each node, which models the probability that the corresponding document has a particular category 150. Some observations about the learning component 140 include (1) it is a probabilistic model, which makes it easier to integrate with other models, (2) it leverages off the best ordinary classifier available, which it uses as an input, and (3) it allows different documents to belong to different numbers of categories (e.g., one document may be known a priori to be a member of categories 150 'wheat, barley, oats' and another of 'earnings, taxes, income' and another of 'wheat, farm, income, taxes'), and (4) the model 140 leverages off existing labels (and an existing classifier) in useful ways to automatically categorize data that are described in more detail below.

Figure 2:
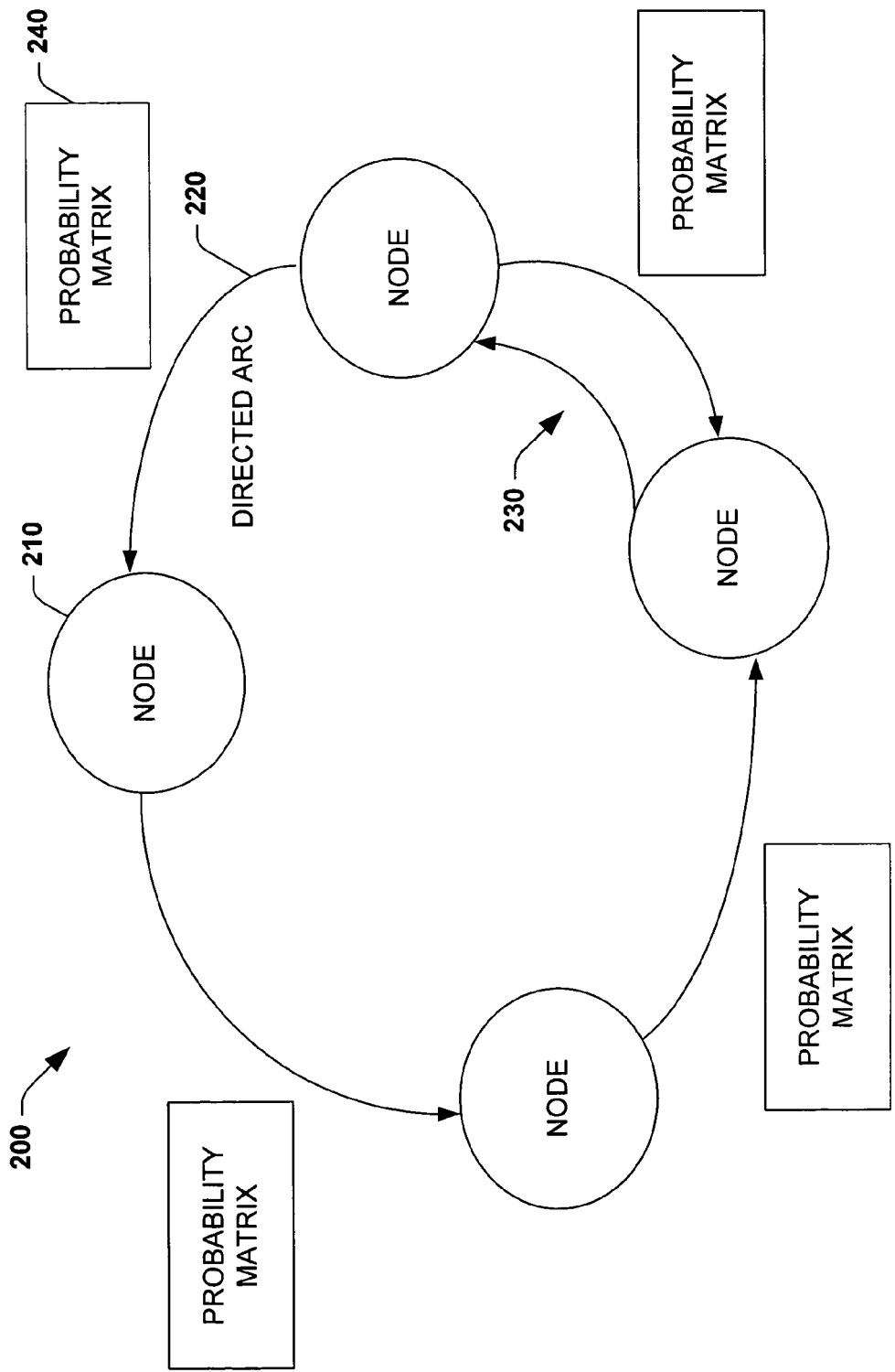
FIG. 2 illustrates an exemplary graphical model for automatically categorizing data.

FIG. 2 illustrates an exemplary graphical model 200. The model 200 includes one or more nodes such as illustrated at 210. To automatically categorize other nodes in the set of possible nodes, at least one data item (e.g., document, file) associated with the nodes 210 is labeled, whereby other nodes of interest can be automatically categorized or labeled there from. As illustrated, the model 200 includes one or more directed arcs 220 which are applied as directed connections between nodes and employed to determine data classifications. At 230, more than one arc can enter or exit a node during automated category determinations. A probability matrix 240 is generally determined for each directed arc 220 between nodes and will be described in more detail below.

The model 200 is also referred to as a Conditional Harmonic Mixing (CHM) model and is considered a highly redundant model, in that for a CHM model of a given problem, the posterior for a given node 210 can be computed from the posterior at any adjacent node, together with the conditional probability matrix 240 on the arc 220 joining them. Generally, CHM processes that the posterior at a given node be that distribution such that the number of bits needed to describe the distributions predicted at that node, by the adjacent nodes, is minimized. This can be achieved by minimizing a KL divergence. The CHM model can also be used to improve the accuracy of another, given classifier.

Figure 3:
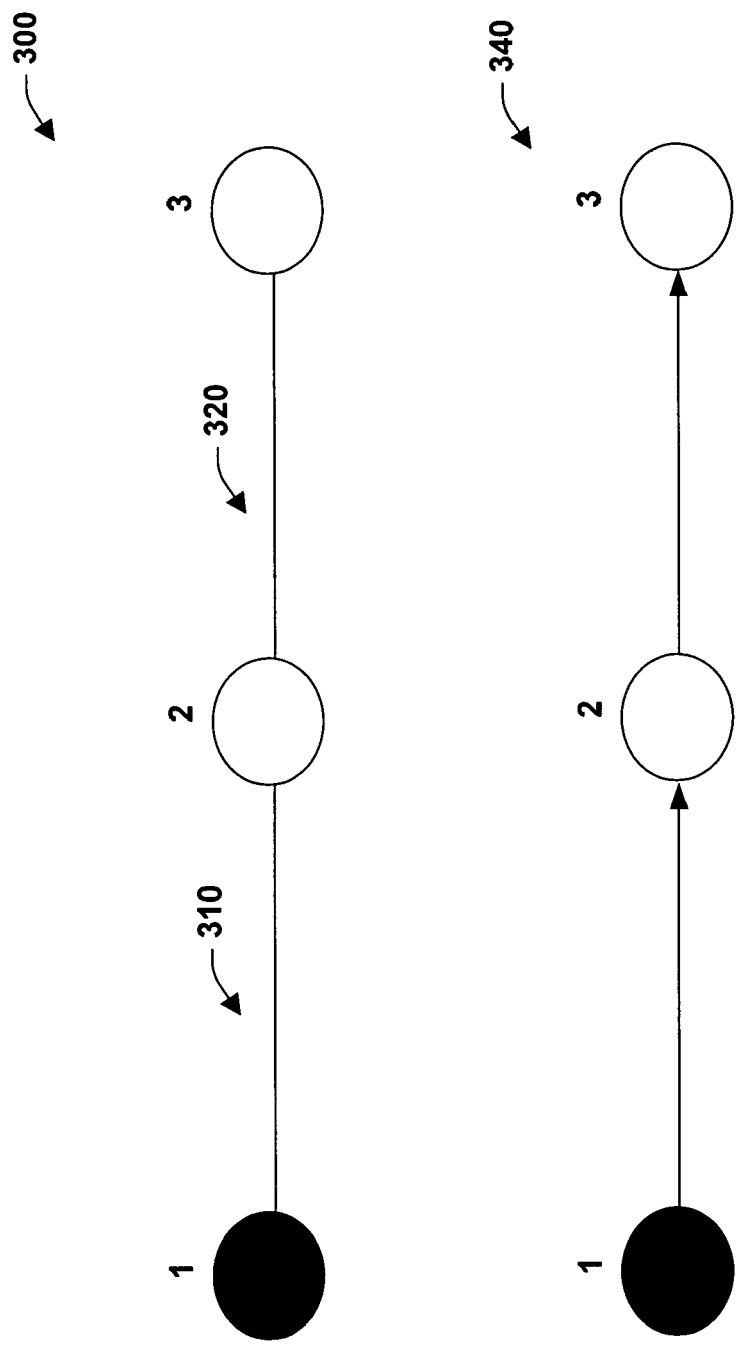
FIG. 3 illustrates a directed arc model that is contrasted to a conventional non-directed arc model.

In the conventional graphical approaches to semi-supervised learning, an underlying intuition is that a function should vary smoothly across the graph, so that closely clustered points tend to be assigned similar function values. This leads to the use of undirected arcs in the graph, since the graph is used essentially to model the density. However there is a second intuition that is provided herein, and that is of the propagation of information. Consider the graph shown at 300 in FIG. 3, the left panel (in this example, filled (unfilled) circles represent labeled (unlabeled) points), where both arcs at 310 and 320 have the same weight. In the harmonic solutions, the state of node 2 is the weighted average of its neighbors. However in this graph 300, it would be of marginal importance to have node 2 care about the state of node 3, since from the information propagation point of view, all of the label information propagates out from node 1 in the graph 300. By making the arcs directed, as in the graph shown at 340, this problem can be addressed with no loss of generality, since an undirected arc between nodes A and B can be simulated by adding arcs A→B and B→A.

A second reason for using directed arcs is that the relations between points can themselves be asymmetric (even if both are unlabeled). For example, in a K nearest neighbor (KNN) approach, if point A is the nearest neighbor of point B, point B need not be that of point A. Such asymmetrical relations can be captured with directed arcs. In general, CHM shares with Gaussian SSL the desirable property that its solutions are harmonic, and unique, and can be computed simply (and iteratively). It shares with Bayesian graphical models the desirable property that it is a probabilistic model from the ground up.

The following description can be applied to the graph 200 in FIG. 2 and includes the following notations. Suppose nodes i and j (i, j ∈ {1, ..., N}) are connected by a directed arc from i to j (throughout, index nodes by i, j, k and vector indices by a, b). Then represent the posterior at any node k as the vector $P(X_k=C_a) P_k$ (indexed by a), and the conditional on the arc as $P(X_j|X_i, G) P_{ji}$, so that the computation of i's prediction of the posterior at j is just the matrix vector multiply $$P_{ji}P_i \doteq \Sigma_b (P_{ij})_{ab}(P_i)_b.$$

It is noted that all conditional matrices are also conditioned on the training data, the graph structure, and other factors, which are denoted collectively by G. It is also noted that the number of classes at different nodes can differ, in which case the conditional matrices joining them are rectangular. Note that the $P_{ji}$ are column stochastic matrices. For brevity, any vector whose components are a nonnegative partition of unity are referred to as a stochastic vector. Then the following mathematical observation holds:

Given any two stochastic vectors $P_i$ and $P_j$, there exists a conditional probability matrix $P_{ij}$ such that $P_i = P_{ij}P_j$. This follows from the choice $(P_{ij})_{ab} = (P_i)_a$ ∀b, and corresponds to the special case that the probability vectors $P_i$ and $P_j$ are independent. This shows that CHM is able, in principle, to model any set of posteriors on the nodes, and that some form of regularization will therefore be needed if expected, for example, to learn nontrivial matrices $P_{ij}$ given a set of posteriors $P_i$. This regularization can be imposed by partitioning the $N_a$ arcs in the graph into a small number n of equivalence classes, where n≪$N_a$, such that arcs in a given equivalence class are to have the same $P_{ij}$. Nearest neighbor relations are then employed to determine equivalence classes.

Figure 4:
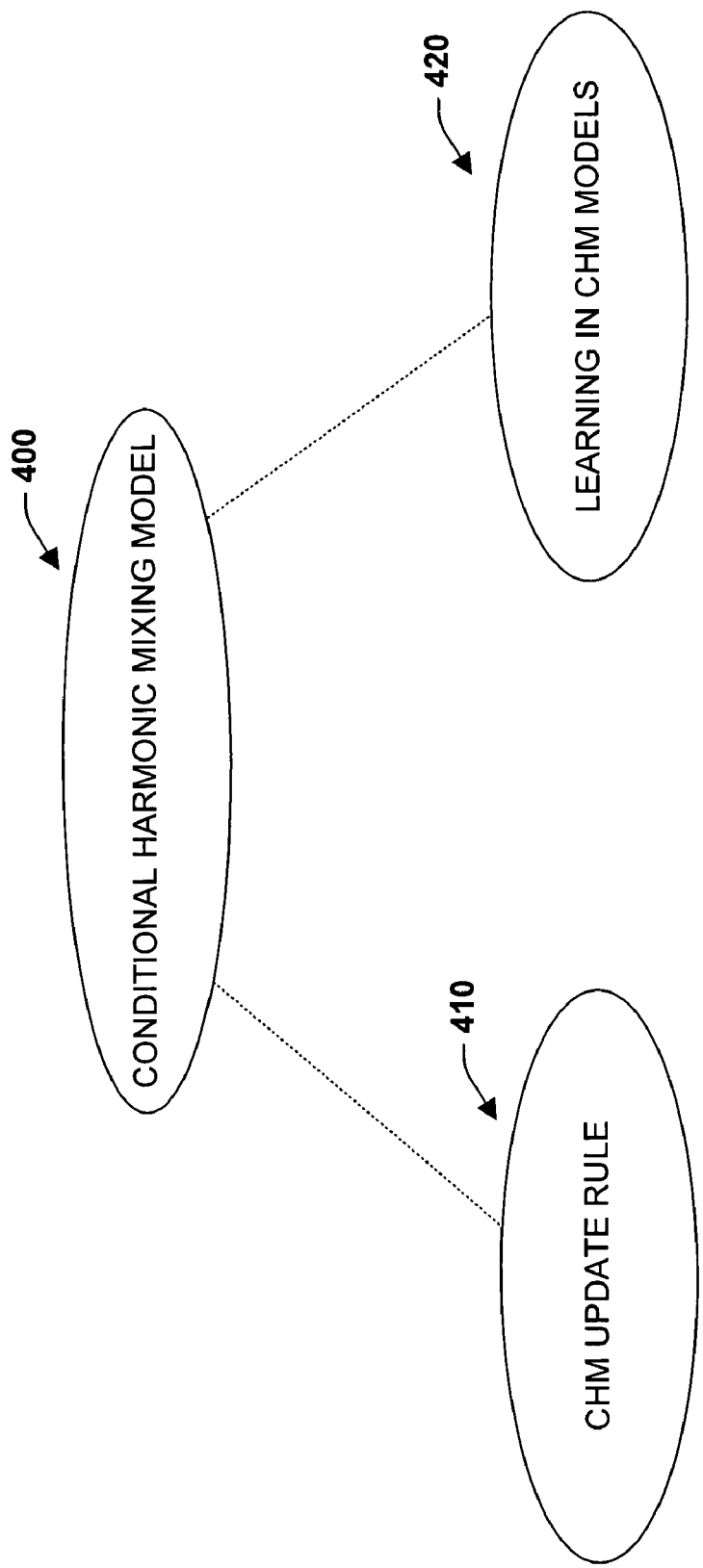
FIG. 4 illustrates a conditional harmonic mixing model.

Referring to FIG. 4, conditional harmonic mixing (CHM) model considerations 400 are illustrated. In general, the structure of a CHM graph depends on the problem at hand, however all graphs share the weak constraint that for every test node i, there exists a path in the graph joining i with a training node. Such nodes are referred to as label-connected, and to the graph as a whole as label-connected if every test node in the graph is label-connected. A neighbor of a given node i is defined to be any node which is adjacent to node i, where 'adjacent' indicates that there exists an arc from j to i. The following notation can be employed where it can be assumed that a random variable at node i has $c_i$ states (or classes), and that the arc from node i to node j carries a $c_j \times c_i$ conditional probability matrix $P_{ji}$. A convention is adopted that $P_{ji}$ is the $c_j \times c_i$ matrix of all zeros if there is no arc from node i to node j. It is denoted that the posterior at node i by the vector $P_i \in e^{c_i}$, for unlabeled nodes, and by $Q_i \in e^{c_i}$ for labeled nodes. Denote the set of labeled nodes by $\mathcal{L}$, with m≐|$\mathcal{L}$|, and the set of unlabeled nodes by $\mathcal{U}$, with n≐|$\mathcal{U}$|, let $\mathcal{M}$(i) ($\mathcal{N}$(i)) denote the set of indices of labeled (unlabeled) nodes adjacent to node i, and define $\mathcal{T}=\mathcal{M}\cup\mathcal{N}$ with n(i)≐‖$\mathcal{T}$(i)‖. Finally, for node i, let p(i) be the number of incoming arcs from adjacent test nodes, and let q(i) be the number of incoming arcs from adjacent training nodes.

At 410 a CHM update rule is considered. A given node in a graph receives an estimate of its posterior from each of its neighbors. These estimates may not agree. Suppose that the hypothesized distribution at node i is $Q_i$, and let the estimates from its n(i) neighbors be $P_j$, j ∈ $e_i$, so that $P_j = P_{jk}P_k$ for each k ∈ (i). Given $Q_i$, the number of bits required to describe the distributions $P_j$ is $$\Sigma_j \{H(P_j) + D(P_j|Q_i)\},$$

where H is the entropy and D the KL divergence. For fixed $P_j$, this is minimized by setting $$(Q_i)_a = (1/n(i))\sum_{j=1}^{n(i)} (P_j)_a.$$

A function on a graph is called harmonic if at each internal node the value of the function is the (possibly weighted) mean of the values at its neighboring points (an internal node, as opposed to a boundary node, is one whose function value is not fixed; below use the terms 'unlabeled node' and 'labeled node' for internal and boundary nodes). Assuming that a solution exists, then at the solution, the posterior at a given node is the weighted mean of the posteriors of its neighbors, where the weights are conditional probability matrices; hence the name 'Conditional Harmonic Mixing'.

Figure 5:
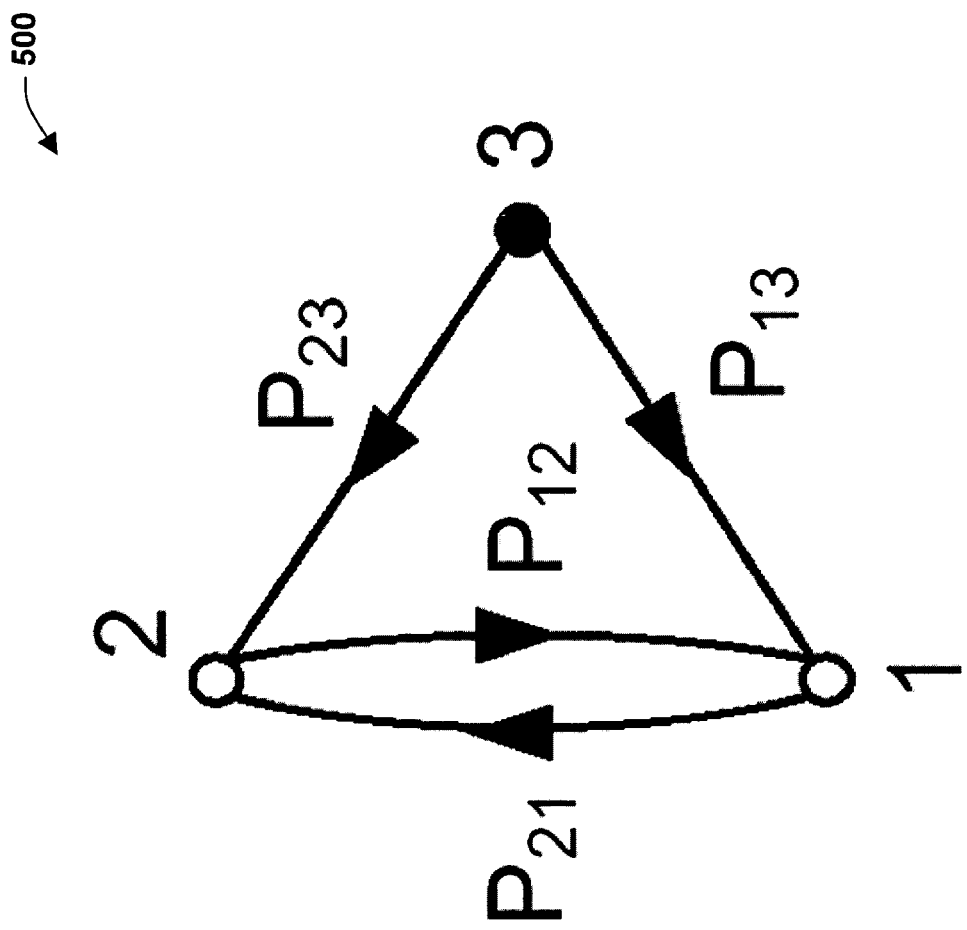
FIG. 5 illustrates an example conditional harmonic mixing graph.

At 420, CHM learning is considered. In this aspect, it is useful to examine a simple model to demonstrate a simple convergence proof. For instance, a 3-point graph 500 is shown in FIG. 5, where the number of classes at each node is C. The consistency conditions arising from the above update rule 410 are Equation 1:

$$\begin{pmatrix} -1 & \frac{1}{2}P_{12} & \frac{1}{2}P_{13} \\ \frac{1}{2}P_{21} & -1 & \frac{1}{2}P_{23} \end{pmatrix} \begin{pmatrix} P_1 \\ P_2 \\ P_3 \end{pmatrix} = 0$$

where $P_3 = (1, 0, 0, ...)$ and where the ones in the matrices represent unit matrices. It is desired to prove four properties of these equations, for any choice of conditional probability matrices $P_{23}$, $P_{21}$ and $P_{13}$: first, that a solution always exists, second, that it is unique, third, that it results in stochastic vectors for the solution $P_2$ and $P_3$, and fourth, that Jacobi iterates will converge to it (by solving with Jacobi iterates, can take advantage of the sparseness of larger problems). The following example has also been proven for a general CHM graph, but this particular example is shown for illustrative purposes. Rearranging yields Equation 2, $$\begin{pmatrix} 1 & -\frac{1}{2}P_{21} \\ -\frac{1}{2}P_{21} & 1 \end{pmatrix} \begin{pmatrix} P_1 \\ P_2 \end{pmatrix} = \frac{1}{2}\begin{pmatrix} P_{13} & P_3 \\ P_{23} & P_3 \end{pmatrix}$$

The equations will take this general form, where the matrix on the left is square (but not necessarily symmetric) and of side Cn, and where the left hand side depends on the unlabeled points (whose posteriors it is desired to find) and the right, on the labeled points. Define Equation 3:

$$b = \frac{1}{2}\begin{pmatrix} P_{13} & P_3 \\ P_{23} & P_3 \end{pmatrix}, \quad M \doteq \begin{pmatrix} 1 & 0 \\ 0 & 1 \end{pmatrix}, \quad N \doteq \begin{pmatrix} 0 & \frac{1}{2}P_{12} \\ \frac{1}{2}P_{21} & 0 \end{pmatrix}$$

and consider the following iterative algorithm for finding the solution, where $x^{(0)}$ is arbitrary: $Mx^{(k+1)} = Nx^{(k)} + b$.

In general, the following considerations may also apply to the above CHM model considerations 400. In one aspect, the model places no assumptions on conditional probability matrices, beyond that that they be column stochastic. In particular, the model does not assume that the conditional probability matrices on the graph are consistent, that is, that there exists a joint probability from which all conditionals (or even any subset of them) could be derived by performing appropriate marginalizations. The CHM algorithm or model can therefore be applied using measured estimates of the conditional probability matrices, for which no precise joint exists. In general A is not symmetric (and need not be row- or column-diagonally dominant). No structure is imposed on the graph beyond its being label-connected. In particular, the graph can contain loops. The numbers of classes at each node can differ, in which case the conditional probability matrices will be rectangular. The model handles probabilistic class labels, that is, the $Q_i$ can be arbitrary stochastic vectors.

Figure 6:
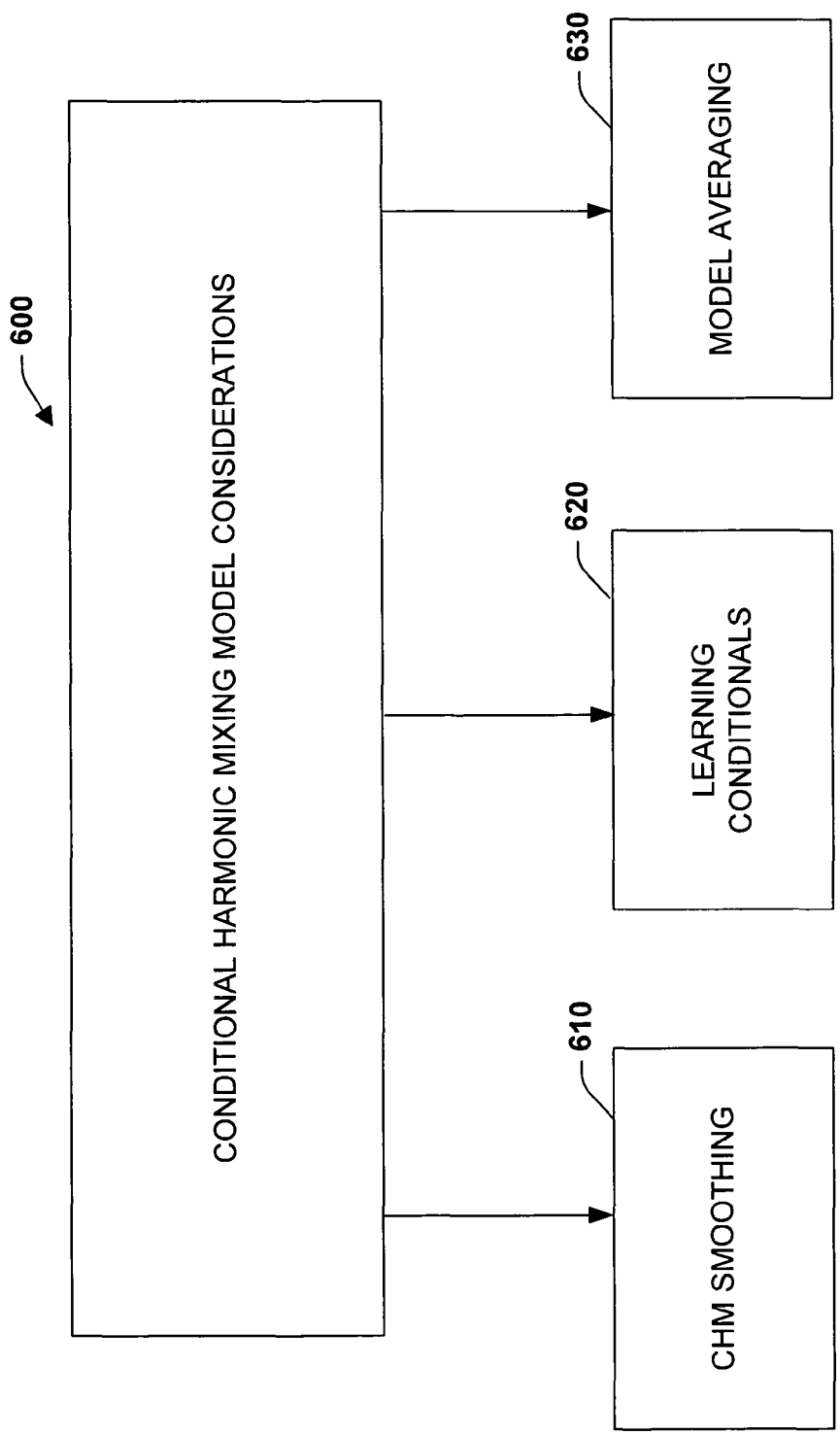
FIG. 6 illustrates conditional harmonic mixing model considerations.

Referring to FIG. 6, conditional harmonic model considerations 600 are illustrated. At 610, CHM smoothing considerations are provided. In one case, assume that the outputs of a given classifier on a dataset are given. The classifier was trained on the available labeled examples, but the amount of training data is limited and it is desired to use semi-supervised learning (SSL) to improve the results. For each node in the graph, attach an additional, labeled node, whose label is the posterior predicted for that data point. In fact, CHM allows one to combine several classifiers in this way. This mechanism has the additional advantage of regularizing the CHM smoothing at 610 where the model can apply more, or less, weight to the original classifier outputs, by adjusting the conditionals on the arcs; furthermore, for graphs that fall into several components, some of which are not label-connected, this method results in sensible predictions for the disconnected pieces (either the original classifier outputs, or the same, but smoothed across the connected sub graph). In the context of CHM, for brevity this procedure is referred to as 'lifting'. Note that in this sense, the restriction mentioned above, that every unlabeled point be reachable by traversing arcs in the graph from at least one labeled node, can be relaxed.

At 620, learning conditionals for the model is considered. In this case, the problem of finding the conditional matrices $P_{ij}$ is considered. For example, one method for solving this is to consider again the simple CHM model shown in FIG. 5, and to simplify the exposition, assume that the number of classes at each node is two, and in addition require that $P_l \doteq P_{13} = P_{23}$ and that $P_u \doteq P_{12} = P_{21}$ (l, u denoting labeled, unlabeled respectively). Parameterize the matrices as Equation 4:

$$PP_l = \begin{pmatrix} 1 - v_1 & v_2 \\ v_1 & 1 - v_2 \end{pmatrix}, \quad Pu = \begin{pmatrix} 1 - v_3 & v_4 \\ v_3 & 1 - v_4 \end{pmatrix}$$

where $0 \leq v_i \leq 1 \; \forall i$. Now assume that the posteriors on the labeled node in FIG. 5, that is, node 3, are given, and denote components by e.g., $[P_{1a}, P_{1b}]$. In that case, Eq. (2) may be rewritten as Equation 5:

$$\begin{bmatrix} -P_{3a} & P_{3b} & -P_{2a} & P_{2b} \\ P_{3a} & -P_{3b} & P_{2a} & -P_{2b} \\ -P_{3a} & P_{3b} & -P_{1a} & P_{1b} \\ P_{3a} & -P_{3b} & P_{1a} & -P_{1b} \end{bmatrix} \begin{bmatrix} v_1 \\ v_2 \\ v_3 \\ v_4 \end{bmatrix} = \begin{bmatrix} 2P_{1a} & -P_{2a} & -P_{3a} \\ 2P_{1b} & -P_{2b} & -P_{3b} \\ 2P_{2a} & -P_{1a} & -P_{3a} \\ 2P_{2b} & -P_{1b} & -P_{3b} \end{bmatrix}$$

which summarizes as $Av = z$. A in general need not be square, and if it is, it may be singular (as it is in this example), and even if it is nonsingular, computing v by inverting A is not guaranteed to give components $v_i$ that lie in the interval [0,1]. Thus to solve this, and to arrive at the desired probabilities, solve the quadratic programming problem:

$$\underset{v}{\operatorname{argmin}} \|Av - z\|^2$$

subject to $0 \leq v_i \leq 1 \; \forall i$. The posteriors $P_i$ for the labeled node can simply be the outputs of a given classifier on the problem, if the classifier outputs are well-calibrated probabilities, or thresholded vectors (whose elements are 0 or 1) for arbitrary classifiers.

At 630, model averaging is considered. If sufficient labeled data is available, then a validation set can be used to determine the optimal graph architecture (i.e., to which neighbors each point should connect). However, often labeled data is scarce, and in fact semi-supervised learning is really aimed at this case—that is, when labeled data is very scarce, but unlabeled data is plentiful. Thus in general for SSL methods, it is desirable to find a way around having to use validation sets to choose either the model or its parameters. In this example, model averaging 630 is employed. That is, for a given graph, given a classifier, use CHM to lift its results; then, perform this process for a variety of graphs, and average the posteriors assigned by CHM to each node, across all graphs. This, in combination with learning the conditionals at 620, makes CHM a largely parameter-free approach (once a general algorithm for constructing the graphs has been chosen), although training using many graphs is more computationally expensive than using a validation set to select one.

Figure 7:
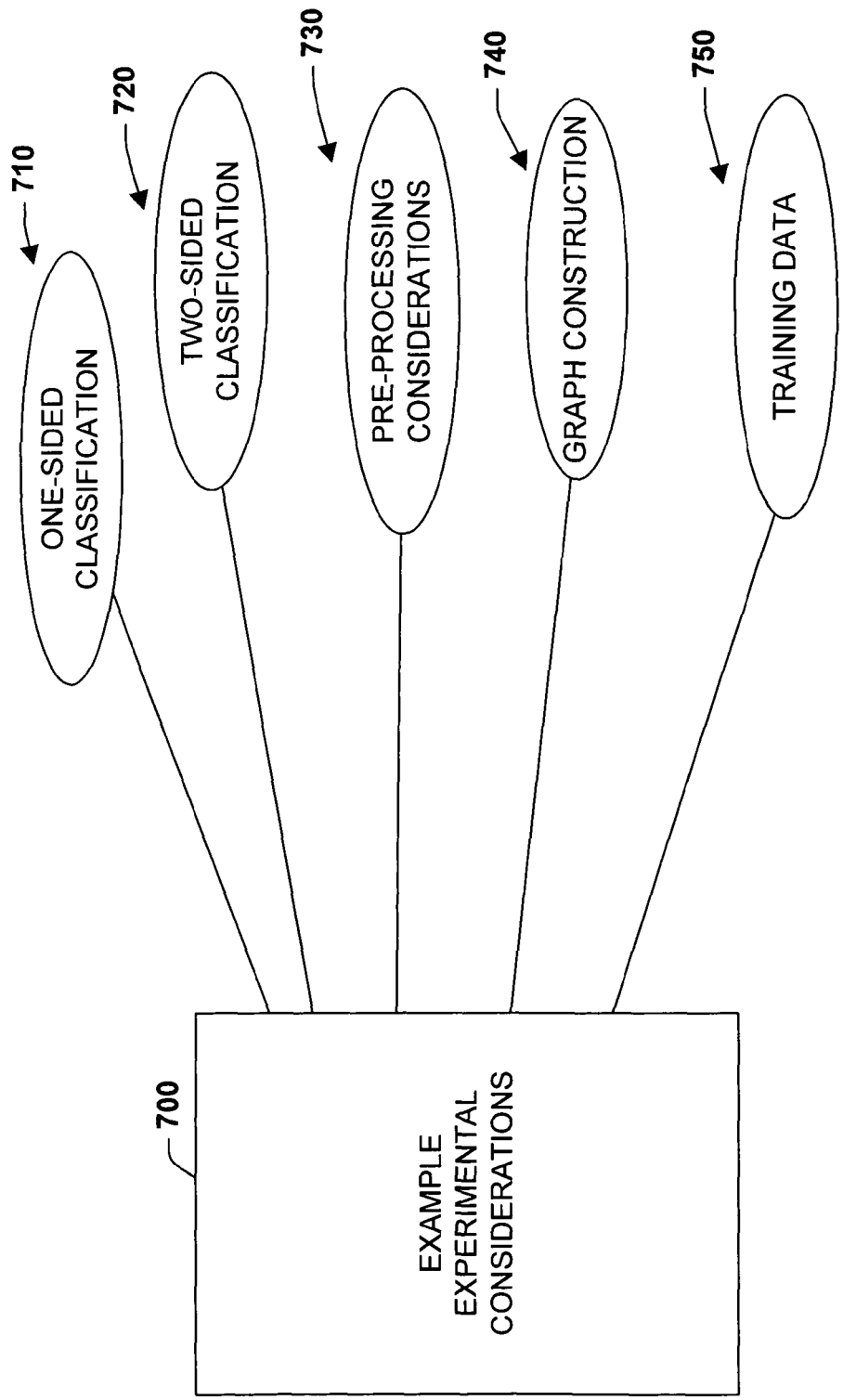
FIG. 7 illustrates example experimental considerations for CHM models.

FIG. 7 illustrates various process aspects for model construction in accordance with example experimental considerations 700. While, for purposes of simplicity of explanation, the process 700 is shown and described as a series or number of acts, it is to be understood and appreciated that the subject process is not limited by the order of acts, as some acts may, in accordance with the subject process, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject process.

At 700, CHM is applied in one example to the problem of text categorization. In this particular example to the categorization of news articles in a Reuters-I data set, with the ModApte split of 9,603 training files and 3,744 testing files, for example. Each news article is assigned zero or more labels and each label is considered to be an independent classification. For the tests, the system was trained and tested on the 10 most common labels in the data set, which generates 10 separate binary classification problems however more or less sets can be processed as can be appreciated.

In general, two types of classification experiment were run: a one-sided (where only positive labeled examples are given) at 710, and two-sided experiment at 720 (where labeled examples of both classes are given). The one-sided task 710 is noted because for some applications, it is easier to obtain labeled data of one class, than of the other, and few algorithms can handle training data that contains no examples of one of the classes. For the one-sided problem 710, CHM was employed to lift the Rocchio (inductive) classifier outputs, since of the methods considered, the Rocchio algorithm was determined suitable for the one-sided task. For two-sided problems at 720, inductive algorithms and/or transductive algorithms can be employed. For example, inductive algorithms could include a linear support vector machine and a mixture of multinomial conditional models. For the mixture model, a multinomial model can be used to model positive examples, while one or more multinomial models can be used to model negative examples.

Typically, for all experiments, it was assumed that the prior for the task is known. For the lifting arcs (i.e., those arcs joining the extra nodes carrying the classifier posteriors with the unlabeled nodes), unit conditional probability matrices are employed, and the base classifier outputs can be mapped to $\{0,1\}$, both for the computation of the learned matrices, and for the CHM computation itself, if well-calibrated output probabilities are not available, or can be used as is, if they are well-calibrated probabilities. For the two-sided case, of the three algorithms used, the SVMs were found to give the highest overall accuracy. All of these algorithms make a hard decision about whether a test point is in or out of a class. For all algorithms, the threshold for this decision point to reproduce the true number of positives was selected on the entire test set (the 'known prior' assumption).

At 730, one particular example for constructing a base classifier to lift is provided although various methods can be employed. In this example, each document to be categorized is pre-processed into a bag of words. For instance, all words within the text, title, and body of the document are used, except words within the author or dateline are excluded. Words within an 11-word stop word list are excluded. Every word can be stemmed using the Porter stemmer for example, and the number of occurrences for each stem is computed for each document (tf). The vector of tf values is then fed to the multinomial classifiers (which can only accept tf vectors). For all other classifiers and for constructing the CHM graph, tf-idf features were used, normalized to lie on the unit sphere.

At 740, graph construction is determined. For CHM, each graph can be constructed using a simple nearest neighbor algorithm where an arc is added from node i to node j if node i is the k'th nearest neighbor of node j, for all $k \leq K$, where K is some integer, provided node j is not itself a labeled node. However many other methods could be used to construct the graph. For the KNN example, in this instance, the conditional probability matrices for all arcs for a given k are shared; this imposes a form of regularization on the parameters, and embodies the idea that k alone should determine the type of link joining the two nodes. Note that this results in a directed graph which in general has no undirected equivalent (that is, a pair of unlabeled nodes can have an arc going one way but not the other, and labeled nodes only have outgoing arcs). The CHM posteriors at each unlabeled node can then be averaged over all the graphs to arrive at the prediction. Unit conditional probability matrices can be used on the arcs, or the matrices can be learned. At 750, various amounts and types of training data can be employed to train the models described herein.

In general, Conditional Harmonic Mixing (CHM) provides a graphical model that can be used for semi-supervised learning. Thus, CHM combines and improves upon earlier work in semi-supervised learning in several ways. First, unlike Bayes networks, CHM can model and learn using conditional probability distributions that do not have a consistent joint. This freedom to use inconsistent conditionals allows processes to learn and infer using simple linear algebra. Second, unlike Gaussian SSL, CHM can model asymmetric influences between random variables. Thus, random variables can have different cardinalities and CHM is not limited to simply modeling scalar harmonic functions. Also, CHM can use a purely inductive algorithm to provide prior knowledge to the semi-supervised learning, which leads to superior performance on one-sided and two-sided empirical benchmarks.

Figure 8:
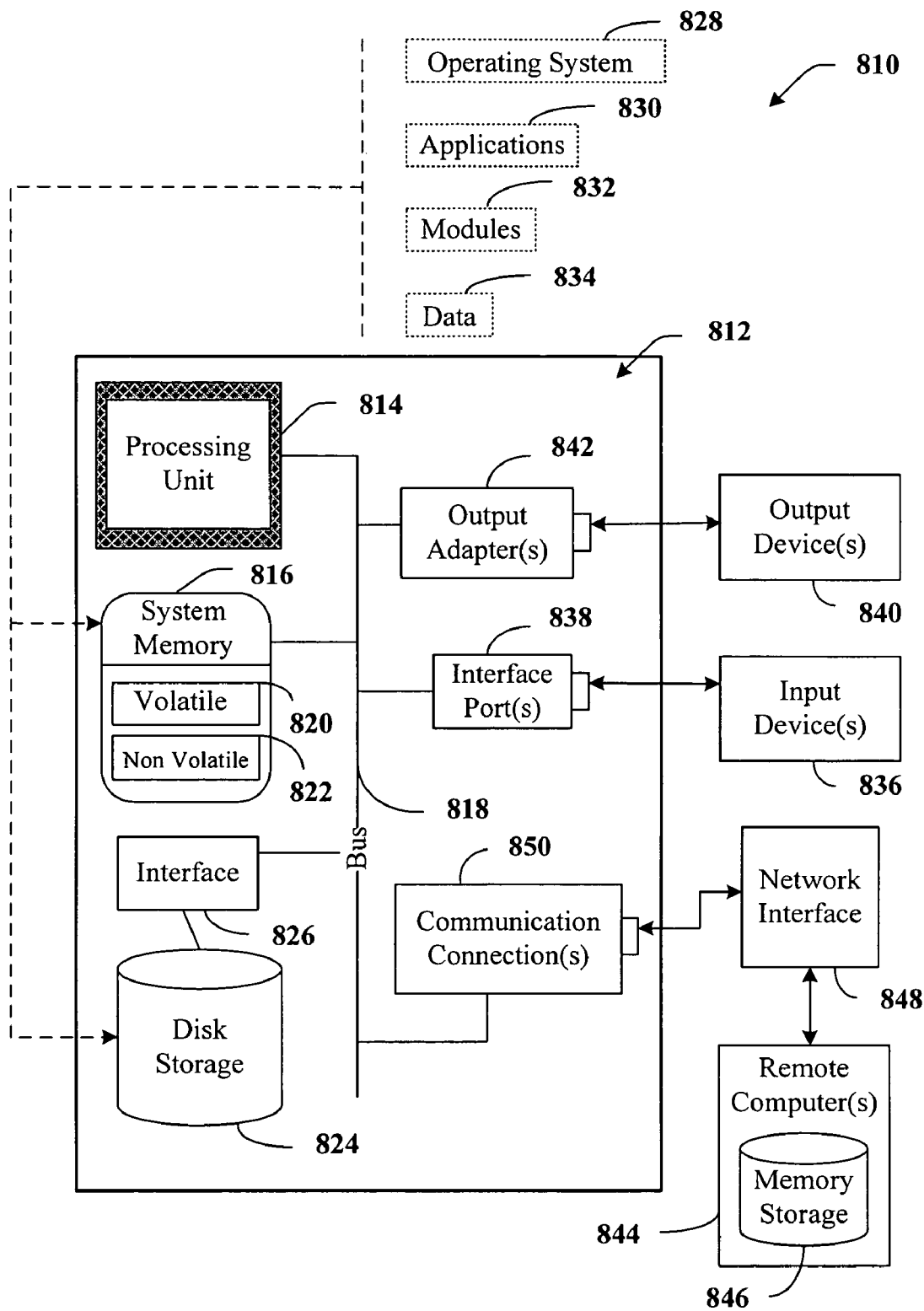
FIG. 8 is a schematic block diagram illustrating a suitable operating environment.

With reference to FIG. 8, an exemplary environment 810 for implementing various aspects described herein includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
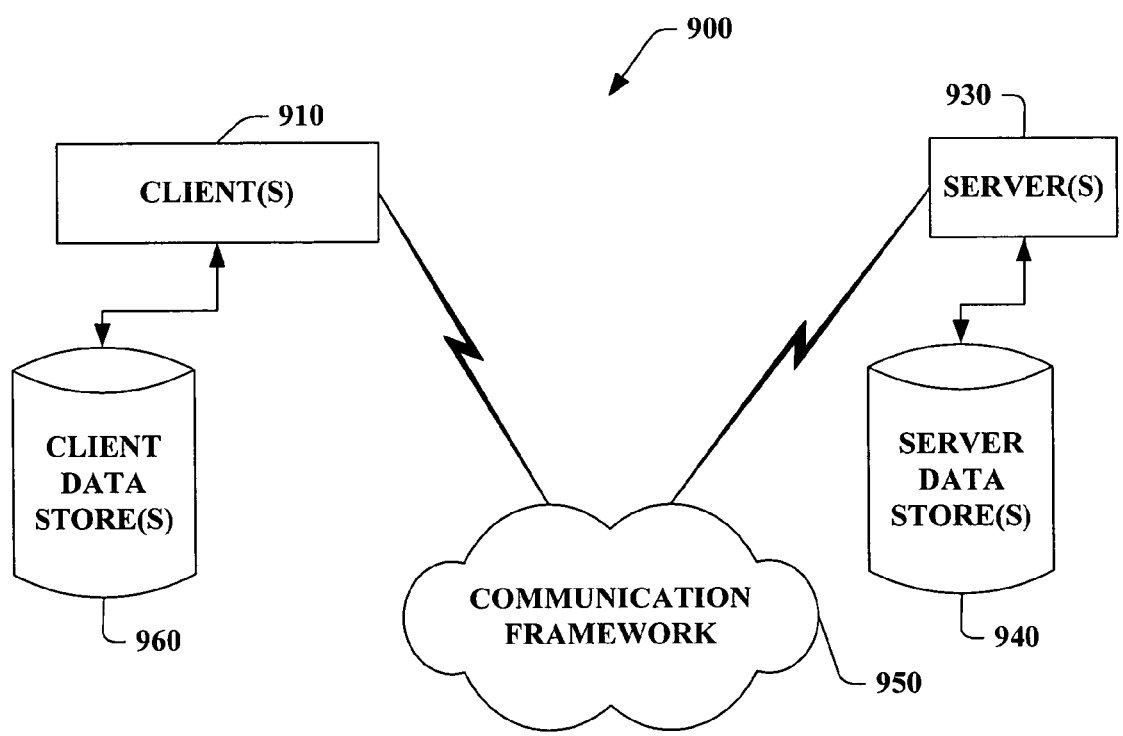
FIG. 9 is a schematic block diagram of a sample-computing environment.

FIG. 9 is a schematic block diagram of a sample-computing environment 900 that can be employed. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automated data classification system, comprising:
a processor;
a memory accessed by the processor, the memory comprising:
a data set stored in the memory and having at least one labeled category node in the data set; and
a semi-supervised learning component stored in the memory and configured to be executed by the processor that employs directed arcs to determine at least one other category node from the data set, the category nodes configured for determining the posterior of any adjacent category node, the directed arcs having an associated conditional probability matrix, the semi-supervised learning component further employing multiple classifier outputs and a smoothing component to alter a weight applied to the multiple classifier outputs by adjusting conditionals of the directed arcs, the semi-supervised learning component further computing a distribution at a selected node of the category nodes, given the distributions of neighbor nodes of the selected node and the conditional probability matrix associated with each of the directed arcs from the neighbor nodes to the selected node, such that a number of bits to describe the distribution is minimized, wherein a subset of the directed arcs comprise loops.

2. The system of claim 1, the learning component is employed to perform at least one of data classification, data regression, data clustering, and data ranking.

3. The system of claim 1, further comprising a plurality of nodes where each node in the plurality of nodes are associated with a differing or similar number of classes.

4. The system of claim 1, wherein each directed arc is associated with a conditional probability matrix.

5. The system of claim 1, wherein each node is coupled to one or more other nodes, each coupling performed by the directed arcs.

6. The system of claim 1, further comprising one or more learning models that are associated with inductive or transductive algorithms.

7. The system of claim 6, the one or more learning models are associated with at least one classifier.

8. The system of claim 1, wherein the classifier outputs are mapped to posterior probabilities.

9. The system of claim 8, wherein the classifier outputs are thresholded.

10. The system of claim 1, further comprising a plurality of graphs.

11. The system of claim 10, further comprising a model averaging component that is applied over posteriors assigned to each node across the plurality of graphs.

12. The system of claim 1, the learning component is applied to single-class or multi-class training sets.

13. The system of claim 1, wherein the semi-supervised learning component computes the distribution such that the number of bits to describe the distribution is minimized by minimizing a divergence.

14. A method comprising:
determining, by one or more processors configured with executable instructions, at least one labeled category node from a data set;
determining, by the one or more processors, directed arcs to at least one other non-labeled node in the data set;
assigning, by the one or more processors, a conditional probability matrix to each directed arc, wherein the category nodes are configured for determining the posterior of any adjacent category node;
applying, by the one or more processors, model smoothing over a plurality of graphs by altering a weight applied to multiple classifier outputs by adjusting conditionals of the directed arcs; and
computing, by the one or more processors, a distribution at a selected node of the category nodes, given the distributions of neighbor nodes of the selected node and the conditional probability matrix associated with each of the directed arcs from the neighbor nodes to the selected node, such that a number of bits to describe the distribution is minimized, wherein a subset of the directed arcs comprise loops.

15. The method of claim 14, the program further comprising incorporating the outputs of at least one classifier from a set of classifiers.

16. The method of claim 14, the program further comprising applying model averaging over a plurality of graphs.

17. A system to facilitate automated data categorization, comprising:
a processor;
a memory accessed by the processor, the memory comprising:
a data set stored in the memory and having at least one labeled category node in the data set, each set of the data set associated with a differing class; and
a semi-supervised learning component stored in the memory and configured to be executed by the processor to:
determine at least one labeled node from the data set;
determine a respective conditional probability matrix for each of the directed arcs in order to automatically determine categories for a set of unlabeled data nodes, the respective matrix being rectangular, wherein the category nodes are configured for determining the posterior of any adjacent category node thereby automatically categorizing the unlabeled data node;
apply model smoothing over a plurality of graphs by altering a weight applied to multiple classifier outputs by adjusting conditionals of the directed arcs; and
compute a distribution at a selected node of the category nodes, given the distributions of neighbor nodes of the selected node and the conditional probability matrix associated with each of the directed arcs from the neighbor nodes to the selected node, such that a number of bits to describe the distribution is minimized, wherein a subset of the directed arcs comprise loops.

* * * * *